US006516460B1

(12) United States Patent
Merks et al.

(10) Patent No.: US 6,516,460 B1
(45) Date of Patent: Feb. 4, 2003

(54) DEBUGGING MULTIPLE RELATED PROCESSES SIMULTANEOUSLY

(75) Inventors: Eduardus Antonius Theodorus Merks, North York (CA); David Paul Olshefski, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/386,212

(22) Filed: Aug. 31, 1999

(30) Foreign Application Priority Data

Sep. 1, 1998 (CA) .............................................. 2246270

(51) Int. Cl.[7] ................................................. G06F 9/45
(52) U.S. Cl. ........................................ 717/124; 717/131
(58) Field of Search ........................ 717/131, 124–129; 714/38

(56) References Cited

U.S. PATENT DOCUMENTS

| | | | | | |
|---|---|---|---|---|---|
| 5,319,645 | A | * | 6/1994 | Bassi et al. ................... | 714/38 |
| 5,611,043 | A | * | 3/1997 | Even et al. .................... | 714/38 |
| 5,675,803 | A | * | 10/1997 | Preisler et al. ............... | 717/131 |
| 5,751,941 | A | * | 5/1998 | Hinds et al. ................... | 706/53 |
| 5,787,245 | A | * | 7/1998 | You et al. ...................... | 714/38 |
| 6,279,028 | B1 | * | 8/2001 | Bradshaw et al. .......... | 709/102 |
| 6,279,124 | B1 | * | 8/2001 | Brouwer et al. ............. | 709/328 |

FOREIGN PATENT DOCUMENTS

JP 07-325732 * 12/1995 ........... G06F/11/28

OTHER PUBLICATIONS

Hseush et al., Data Path Debugging . . . , ACM, Nov. 1988, p. 236–247.*
Elshoff, A Distributed Debugger for Amoeba, ACM, Nov. 1988, p. 1–10.*
MCDowell et al. Debugging Concurrent Programs, ACM, 1989, p. 593–622.*
Grabner et al., Debugging of Concurrent Processes, IEEE, 1995, p. 547–554.*
Pressman, Bringing Testiong Into the Fold, 1996, IEEE, p. 91–93.+*
Stewart et al., Non–Stop Monitoring . . . , 1997, Canadian Crown, p. 263–269.*
Chung, et al., A Concurrent Program Debugging Environment . . . , 1997, IEEE, p. 460–465.*

* cited by examiner

Primary Examiner—Tuan Q. Dam
Assistant Examiner—John Q. Chavis
(74) Attorney, Agent, or Firm—Scully, Scott, Murphy & Presser; Manny W. Schecter, Esq.

(57) ABSTRACT

Methods, systems and articles of manufacture comprising a computer usable medium having computer readable program code means therein are provided for debugging multiple related processes simultaneously and more particularly provided for debugging multiple related processes simultaneously from one instance of a debugger. Being able to debug processes simultaneously in one instance of a debugger gives the user more control in recreating the specific ordering of events that generate a failure in processing. Further, being able to debug processes simultaneously from the same instance of a debugger provides usability gains and convenience by, for example, allowing the user to view information flowing between processes and the states of the processes.

20 Claims, 5 Drawing Sheets

DEBUGGING MULTIPLE RELATED PROCESSES SIMULTANEOUSLY

BACKGROUND OF THE INVENTION

1. Technical Field

The present invention relates to debugging multiple related processes simultaneously. More particularly, this invention relates to debugging multiple related processes simultaneously from one instance of a debugger

2. Prior Art

As part of the development of software applications, software programmers frequently must "debug" their code to ensure it operates properly and without interruption. There are numerous debugging methods and techniques, including special debugging application programming interfaces and breakpoints. To aid programmers, debugging programs or debuggers have been developed. Debuggers can be stand-alone or integrated into another software application such as an object-oriented application development environment.

Many of the current state-of-the-art debuggers do not simultaneously debug multiple related processes (programs) using one instance of the debugger. Related processes are processes that are spawned, directly or indirectly, from a single process. For example, a parent process may spawn child related processes and in turn, the child related processes may act as a parent process spawning further child related processes; all processes spawned in this manner are related to each other. To debug related processes, a user often must start one or more instances of a debugger to debug a parent process and its child process(es). And, an example of debuggers heretofore not simultaneously debugging multiple related processes using one instance of a debugger are those designed for the Microsoft Windows NT® and Windows® 95 operating systems.

Debugging multiple related processes simultaneously can be important since processes often work in conjunction with other processes. One such example is the "Producer"/"Consumer" problem where one process produces data or information that another process requires as input. Being able to debug both the Producer process and Consumer process simultaneously has advantages, especially when the communication between the two processes are asynchronous and the events sent between the Producer and Consumer occur at non-deterministic rates or occur in a non-deterministic ordering. Being able to debug both processes simultaneously gives the user more control in recreating the specific ordering of events that generate a failure in processing. Further, being able to debug both processes simultaneously from the same instance of the debugger provides usability gains and convenience by for example allowing the user to view information flowing between processes and the states of the processes.

In the Windows NT and Windows 95 operating systems, the problem of debugging related processes can be understood by examining the application programming interface (API) functions these operating systems provide which allow debuggers to perform process control. In particular, the functions WaitForDebugEvent( ) and ContinueDebugEvent( ) are provided by Windows NT and Windows 95 to debug a process. The first function, WaitForDebugEvent( ), monitors for the occurrence of a debug event in a process that has been initiated for debugging by the function ContinueDebugEvent( ). When a debug event occurs in a process, that process is stalled. Debug events can include the spawning of a child process or a programming fault. The second function, ContinueDebugEvent( ), initiates debugging of a process and continues debugging of a process if the process has been stalled due to the occurrence of a debug event observed by the function WaitForDebugEvent( ). A key constraint that both these functions share is that only the thread that created the process being debugged can call WaitForDebugEvent( ) or ContinueDebugEvent( ). Therefore, debugging related processes in a single instance of a debugger has been constrained. As has been known in the art debugging related processes can be performed by invoking multiple instances of a debugger. Invoking multiple instances of a debugger has the apparent disadvantages of using more computer resources such as processing and memory.

As a pseudocode example, the following function, CreateProcesso ( ), can be used to create a process on the Windows NT and Windows 95 operating systems:

```
BOOL CreateProcess(LPCTSTR lpApplicationName,
LPSTR lpCommandLine,
LPSECURITY_ATTRIBUTES lpProcessAttributes,
LPSECURITY_ATTRIBUTES lpThreadAttributes,
BOOL bInheritHandles,
DWORD dwCreationFlags,
LPVOID lpEnvironment,
LPCTSTR lpCurrentDirectory,
LPSTARTUPINFO lpStartupInfo,
LPPROCESS_INFORMATION lpProcessInformation
);
```

The debugger loads the debuggee by making a call to CreateProcess( ). The thread which executes this call becomes the only thread that can thereafter make calls to WaitForDebugEvent( ) and ContinueDebugEvent( ). We can now refer to this thread as being "special". Pseudocode to perform this might be as follows:

```
//executing on "special" debugger thread
//
PROCESS_INFORMATION process_info;
STARTUPINFO startup_info={0};
startup_info.cb=sizeof(STARTUPINFO);
CreateProcess(NULL,
   "example.exe",
   NULL,
   NULL,
   False,
   DEBUG_PROCESS| CREATE_NEW_CONSOLE|
   NORMAL_PRIORITY_CLASS,
   NULL,
   NULL,
   &startup_info,
   &process_info);
DWORD process_id=process_info.dwProcessId;
DWORD thread_id=process_info.dwThreadId;
```

Next, in order to run the newly created process, the debugger must issue a ContinueDebugEvent( ) from the "special" thread. This allows the newly created debuggee process to begin execution:

```
// executing on "special" debugger thread
//
ContinueDebugEvent(process_id,thread_id,DBG_
   CONTINUE);
```

In order to receive notifications about events occurring in the debuggee, the debugger must then issue a WaitForDebugEvent( ) on the "special"thread. If INFINITE is specified as the second argument to the call, then the WaitForDebugEvent( ) blocks indefinitely until an event occurs:
// executing on "special" debugger thread
// blocks until an event occurs
//
DEBUG_EVENT debug_event;
WaitForDebugEvent(&debug_event, INFINITE);

The debugger can be considered as being in a cycle or loop. Once WaitForDebugEvent( ) returns with an event, the debugger would respond to the event (such as a breakpoint being hit or a child process being spawned) and perform some action based on the event. Then, to restart the debuggee, the debugger would return back on a loop to call ContinueDebugEvent( ) again which will restart the debuggee. The pseudocode for such a cycle might be as follows:
// executing on "special" debugger thread
//
DEBUG_EVENT debug_event;
for (;;) {
// let the debuggee process run
//
ContinueDebugEvent(process_id,thread_id,DBG_CONTINUE);
// blocks until an event occurs
//
WaitForDebugEvent(&debug_event,INFINITE);
// handle the event that occurred
//
FunctionToHandleDebugEvent(debug_event);
}

FunctionToHandleDebugEvent( ) will handle the event (such as a breakpoint) returned via the call to WaitForDebugEvent( ) by, for example, updating the state and views of the debugger and/or allowing the user to examine the state of the debuggee or terminate the loop. When the user has finished examining the state of the debuggee, the call to FunctionToHandleDebugEvent( ) will return back to the loop in order to restart the debuggee (unless terminate within FunctionToHandleDebugEvent( )). Indeed, FunctionToHandleDebugEvent( ) can block (not return) until the user wants to restart the debuggee.

This flow of control works well when debugging a single process via this "special" thread. A problem arises when a child process is created by the process being debugged. If the debuggee at some point spawns another process (for example, for WaitForDebugEvent( ) returns a CREATE_PROCESS_DEBUG_EVENT) then the debugger must manage the newly created process on the same "special" thread.

To handle the additional process(es), the above loop would need to be modified. ContinueDebugEvent( ) would need to be called for all processes being debugged, not just the original process. This modification is shown below by the addition of the forEachProcessBeingDebugged pseudo-instruction.
// executing on "special" debugger thread
//
DEBUG_EVENT debug_event;
for (;;) {
// let all the debuggee processes run
//
for EachProcessBeingDebugged{
// let the debuggee process run
//
ContinueDebugEvent(process_id, thread_id,DBG_CONTINUE);
}
// blocks until an event occurs
//
WaitForDebugEvent(&debuq_event,INFITITE);
// handle the event that occurred
//
FunctionToHandleDebugEvent(debug_event);
}

However, this approach to debugging multiple related processes in the Windows NT and Windows 95 environments can fail. One such scenario is as follows:
1. While process A is being debugged it spawns another process B.
2. ContinueDebugEvent( ) is called for both processes in the loop above so that both process A and process B beg-n execution.
3. WaitForDebugEvent( ) is called and blocks waiting for an event to occur for either process.
4. WaitForDebugEvent( ) returns an event for process A. The event is handled by FunctionToHandleDebugEvent( ) and it is determined that process A should not be restarted until an event from process B occurs (for example, if the user set one breakpoint in process A and one breakpoint in process B, and wants to examine the state of both processes after both breakpoints have been hit). At this point, process B is still running; the event received for process A stops process A but not process B. So, FunctionToHandleDebugEvent( ) can do one of two things:
   a) not return to the loop (block) until the user wants process A to continue execution. However, while FunctionToHandleDebugEvent( ) is waiting for the user, process B, which is still executing, may generate a debug event. So, the user, who is waiting for a debug event to occur for process B, won't receive the debug event for process B because the loop to call ContinueDebugEvent( ) has not been restarted.
   b) flag process A as "NO_RESTART" and return to the loop. In this case, process A and process B would each be flagged initially as "RESTART" and the loop forEachProcessBeingDebugged would be modified to forEachProcessBeingDebuggedAndRESTART in order to call ContinueDebugEvent( ) only for the process(es) that are flagged as "RESTART", thereby excluding the process(es) flagged as "NO_RESTART". Thus, ContinueDebugEvent( ) would be called for process B but not for process A. Then, WaitForDebugEvent( ) is called and is blocked waiting for an event from process B (since only process B is running). However, the user may want to restart process A. In this example, the user will have to wait until WaitForDebugEvent( ) unblocks due to an event from process B; the "special" thread is blocked, waiting for an event from process B, and cannot be used to restart process A.

It is desirable to provide a method, system and article of manufacturer comprising a computer usable medium having computer readable program code means therein for debugging multiple related processes that overcomes the foregoing and other disadvantages of debugging techniques and problems.

SUMMARY OF THE INVENTION

Accordingly, it is an object of the invention to provide new and useful methods, systems and articles of manufacture comprising a computer usable medium having computer readable program code means therein for advantageously debugging multiple related processes in a single instance of a debugger.

It is a further object of the invention to provide new and useful methods, systems and articles of manufacture comprising a computer usable medium having computer readable program code means therein that provide the ability for a user to simultaneously debug multiple related processes in order to give the user more control recreating the specific ordering of events that generate a failure in processing.

It is also an object of the invention to provide usability gains and convenience to a user of a debugger, through the ability to debug multiple related processes simultaneously from the same instance of a debugger, by for example allowing the user to view information flowing between processes and the states of the processes.

In accordance with the invention, these and other objects are accomplished by a method for debugging multiple related processes in one instance of a debugger comprising the steps of initiating debugging of a plurality of related processes in said debugger, checking during a timeout period for a debug event that has occurred within said related processes, if a debug event has occurred, processing said debug event, and after said steps of checking or processing, continuing debugging of all related processes. Further, the step of processing said debug event may comprise, if said debug event relates to spawning of a related process, creating a view in a graphical user interface of said debugger with respect to said spawned related process. Indeed, the aforementioned methods may further comprise the steps of selectively designating a process as stopped or determining if any of said related processes are stopped, waiting or running and if there are no processes stopped, waiting or running, terminating the execution of the debugger. Also, said step of processing in said method may comprise, if said debug event relates to termination or completion of a related process, deleting a view in a graphical user interface of said debugger with respect to said terminated or completed related process.

Additionally, the methods may be performed in the Windows NT operating system. Particularly, in the Windows NT operating system, the step of checking may comprise executing the WaitForDebugEvent( ) command for said timeout period and the steps of initiating and continuing comprise executing the ContinueDebugEvent( ) command for said related processes.

A method for debugging a program is provided comprising the steps of designating a plurality of related processes of the program for debugging in a single instance of a debugger, determining during a timeout period whether a debug event has occurred among said plurality of related processes, if a debug event has occurred, processing said debug event, and performing said steps of designating, determining or processing repeatedly until all said related processes are terminated.

Further, in accordance with this invention, an article of manufacture is provided comprising a computer usable medium having computer readable program code means therein for debugging multiple related processes in one instance of a debugger, the computer readable program code means in said computer program product comprising computer readable code means for initiating debugging of a plurality of related processes in said debugger, computer readable code means for checking during a timeout period for a debug event that has occurred within said related processes, computer readable code means for processing said debug event if said debug event has occurred, and computer readable code means for continuing debugging of all related processes after said checking or processing. Further, the computer readable code means of processing said debug event may comprise computer readable code means for, if said debug event relates to spawning of a related process, creating a view in a graphical user interface of said debugger with respect to said spawned related process. The aforesaid article of manufacture may further comprise compute readable code means for selectively designating a process as stopped. The above article of manufacture may further comprise computer readable code means for determining if any of said related processes are stopped, waiting or running, and computer readable code means for, if there are no processes stopped, waiting or running, terminating the execution of the debugger. Also, said computer readable code means of processing said debug event may comprise computer readable code means for, if said debug event relates to termination or completion of a related process, deleting a view in a graphical user interface of said debugger with respect to said terminated or completed related process. Further, said computer readable code means for processing said debug event may comprise computer readable code means for stopping a related process based upon a type of said debug event.

The aforementioned articles of manufacture may comprise computer readable code means is capable of execution in the Windows NT operating system. Further, said computer readable code means for checking may comprise computer readable code means for executing the WaitForDebugEvent( ) command for said timeout period and said computer readable code means for initiating and continuing comprise computer readable code means for executing the ContinueDebugEvent( ) command for said related processes.

An article of manufacture is provided comprising a computer usable medium having computer readable program code means therein for debugging a program, the computer readable program code means in said computer program product comprising computer readable code means for designating a plurality of related processes of the program for debugging in a single instance of a debugged computer readable code means for determining during a timeout period whether a debug event has occurred among said plurality of related processes, computer readable code means for, if a debug event has occurred, processing said debug event, and computer readable code means for performing said steps of designating, determining or processing repeatedly until all said related processes are terminated.

Lastly, a computer system for debugging multiple related processes in one instance of a debugger is provided comprising means for initiating debugging of a plurality, of related processes in said debugger, means for checking during a timeout period for a debug event that has occurred within said related processes, means for processing said debug event if a debug event has occurred, and means for continuing debugging of all related processes after said checking or processing. Also, a computer system for debugging a program is provided comprising means for designating a plurality of related processes of the program for debugging in a single instance of a debugger, means for determining during a timeout period whether a debug event has occurred among said plurality of related processes, means for, if a debug event has occurred, processing said debug event; and means for performing said steps of designating, determining or processing repeatedly until all said related processes are terminated.

BRIEF DESCRIPTION OF THE DRAWINGS

Preferred embodiments of the present invention will now be described, by way of example only, with reference to the accompanying drawings in which:

FIG. 4 illustrates the graphical user interface of an embodiment of the present invention showing information regarding the state of the parent process referred to in FIG. 3; and FIG. 5 illustrates the graphical user interface of an embodiment of the present invention showing information regarding a further child process spawned from the parent and child processes of FIG. 3.

DETAILED DESCRIPTION OF THE PREFERRED EMBODIMENTS OF THE INVENTION

Figure 1:
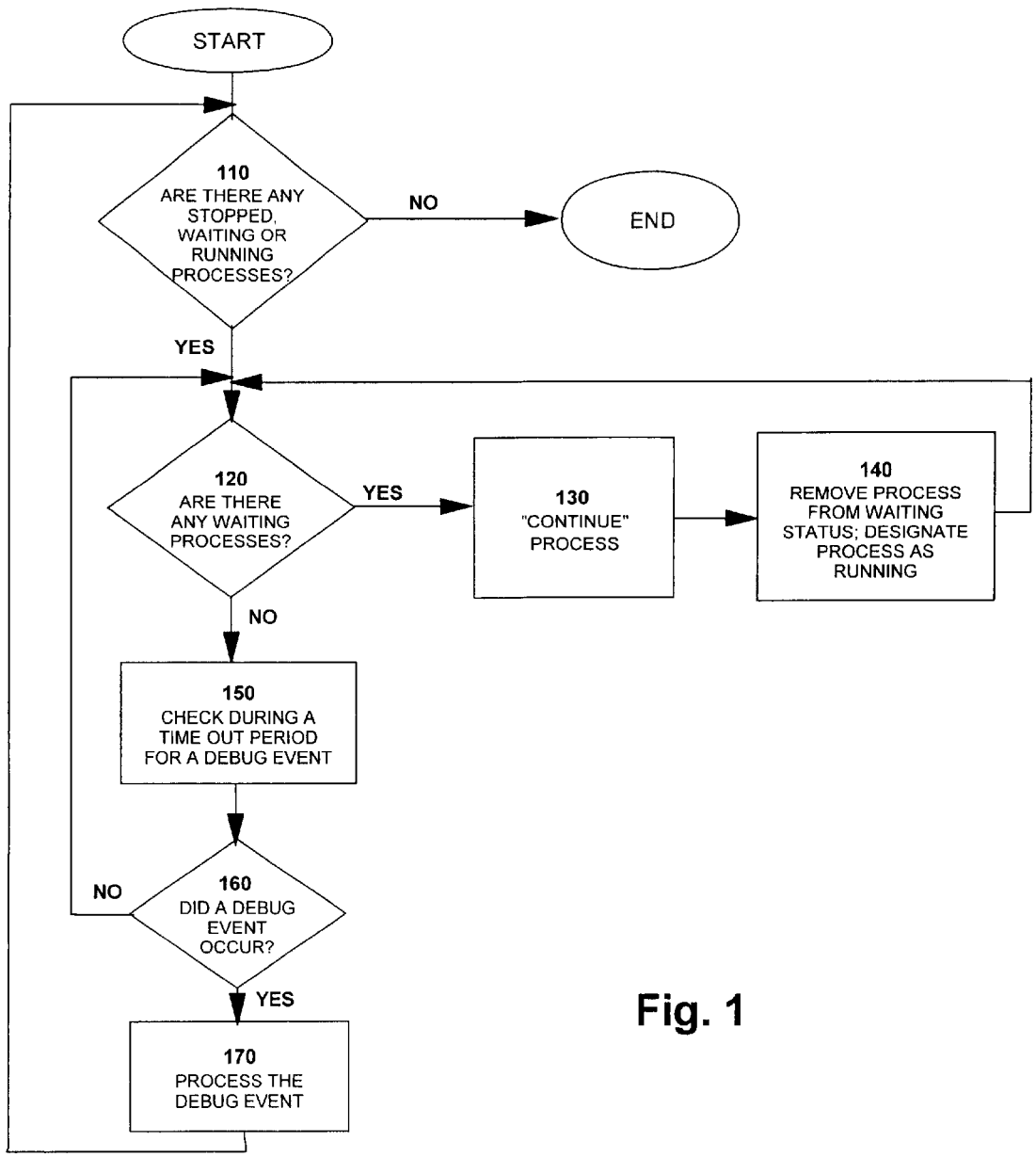
FIG. 1 is a flow chart which illustrates the process of debugging multiple.related processes in accordance with the present invention.

Referring to FIG. 1, the preferred embodiment of the present invention capable of debugging multiple related processes simultaneously in one instance of a debugger will be described. A debugger according to the preferred embodiment is started wherein a process and each related process is designated initially for running, unless optionally otherwise designated, for example, as stopped (not shown). Optionally, the debugger may provide the ability to debug two or more processes and their related processes, effectively allowing a user to debug two or more programs simultaneously in one instance of a debugger. The debugger preferably determines whether there are any stopped, waiting or running processes 110. A running process is a process that is operating in its normal course of execution. A waiting process is a process stalled temporarily from execution by, for example, a debug event. A stopped process is a process selectively designated to discontinue its normal course of execution and can be selectively designated to continue its execution. If there are no stopped, waiting or running processes, e.g., all process have completed execution or have been terminated, then the debugger discontinues processing of those processes. At this point, optionally, the debugger may be terminated, be instructed to restart debugging of the previously completed or terminated processes, or be instructed to debug a new set of processes.

If there are stopped, waiting or running processes, each process is assessed to determine whether it is a waiting process 120. If it is a waiting process, debugging of that process is started or continued by, for example, a ContinueDebugEvent( ) command 130. That process is then removed from waiting status and designated as running 140. Stopped and running processes are unaffected: stopped processes remain stopped; running processes are allowed to continue. Remaining waiting processes are then checked 120 and started or continued accordingly.

Once the waiting processes have been started or continued, as the case may be, the debugger "waits" for a debug event 150 to occur in any of the processes by, for example, the issue of a WaitForDebugEvent( ) command. A debug event may occur in the parent process or any child process. A debug event may occur, for example, by the spawning of a child process from a parent process, by the processing of a set breakpoint in a process, by an error in the process code, by the completion of a process or by the stopping or terminating of a process by the user. Types of debug events are well-known to those skilled in the art and the reference to specific types of debug events herein shall not limit the scope of the invention but merely serve as an example of the class of debug events in general. Indeed, the class of debug events may increase in number and variety in the future and therefore the invention herein equally applies to such future types of debug events as the types of debug events of the present.

The "waiting" step 150 is limited by a timeout period to check for a debug event. In a Windows NT embodiment, the debugger would check a debug event queue, by means of the WaitForDebugEvent( ) command, for the timeout period to see if a debug event has occurred. If a debug event had occurred during the execution of that command or occurred before initiation of that command, the command would return an indication of the occurrence of a debug event because of the presence of a debug event of the queue. Otherwise, there would be no indication of a debug event.

The timeout period may be in the range of 1 millisecond to 10 seconds, and preferably is 100 milliseconds. In choosing an appropriate timeout period, some of the considerations include processing speed of the computer, performance of the debugger and limitations of the operating system. The actual timeout period shall not limit the scope of the invention as processor technology may lower the timeout period below 1 millisecond and a timeout period greater than 10 seconds may be optionally chosen (but such a long timeout period would clearly negatively impact debugger performance). Once the timeout period lapses, the debugger checks for whether a debug event has occurred 160 as returned by the "waiting" step 150. If no debug event has been returned, the steps of "continuing" all waiting processes 120, 130, 140 are again performed, the debugger again "waits" for the timeout period to check for a debug event 150 and the debugger again checks if a debug event has been returned.

Should a debug event occur, the debug event is processed 170 by, for example, updating the process information in the debugger by, for example, refreshing the state and views of the user interface of the debugger, reporting the debug event, creating a new view in the debugger's user interface in the case of the spawning of a child process, or removing a view in the debugger's user interface in the case of the termination or completion of a process (not shown). Process information may include information such as process source code, values of process data and variables and indications as to what point in process source code a process has executed (see generally FIGS. 2–5). Additionally, a process may be manipulated by the user or the debugger logic by, for example, stopping or terminating a process. Designating a process as stopped removes that process from execution of steps 130 and 140. Processing of a debug event is well-known to those skilled in the art and the particular steps of processing a debug event are virtually unbounded. Once a debug event is processed, the steps of checking for whether there are any stopped, continuing or waiting processes 110, "continuing" all waiting processes 120, 130, 140 and all subsequent steps described above are performed again.

Throughout the execution of the debugger, any process may be, by user control or other debugger logic, terminated, restarted from a stopped condition or stopped during a running condition (not shown). For example, the termination or completion of a process may result in the removal of that process' view in the debugger's user interface. Additionally, the user may step line-by-line through the process, set breakpoints and perform any other conventional debugging techniques.

Thus, in the debugger of the present invention, multiple processes may be debugged simultaneously such that the debugging of one process does not block debugging of the remaining processes.

Specifically, the preferred embodiment of the present invention allows for simultaneous debugging of multiple related processes in a Windows NT and Windows 95 environment by having the call to WaitForDebugEvent( ) specify a timeout period and for the loop to continuously poll for events from all debuggee processes. The pseudocode is as follows:

```
// executing on "special" debugger thread
//
DEBUG_EVENT debug_event;
for (;;) {
// let all the debuggee processes run that are supposed to run
//
forEachProcessBeingDebuggedAndRESTART{
ContinueDebugEvent(process_id,thread_id,DBG_
    CONTINUE);
}
// timeout if event doesn't occur
//
rc=WaitForDebugEvent(&debug_event,100);// 100 milli-
    second timeout
// handle the event that occurred if we didn't just timeout
if (rc) {
FunctionToHandleDebugEventAndReturn(debug_event);
}
}
```

As described above, the loop forEachProcessBeingDebuggedAndRESTART( ) in the debugger will only call ContinueDebugEvent( ) for those processes which are flagged as"RESTART" (alternatively, the loop may only call ContinueDebugEvent( ) for those processes not flagged "NO_RESTART"). Initially, all processes will be flagged "RESTART" (or not be flagged "NO_RESTART" in the alternative example). Optionally, certain process(es) may be flagged "NO_RESTART" (stopped) in order to exclude certain processes from being debugged.

With each process flagged "RESTART" running, the debugger calls WaitForDebugEvent( ) with a timeout period. In a preferred embodiment and as described above, the timeout period is 100 milliseconds. If a debug event is found on the debug event queue during the timeout period, the flag RC is set to true; otherwise RC is false. If RC is true, the non-blocking FunctionToHandleDebugEventAndReturn( ) is called which will flag the process generating the debug event as wither "NO_RESTART" or "RESTART", process the debug event by, for example, updating the state and views of the debugger, and return back to the loop. Otherwise if RC is false, the loop is returned. Further, throughout the execution of the debugger and not shown in the pseudocode above, a user or other debugger logic may control the processes by, for example, terminating any or all of them, restarting any or all processes from a stopped condition or stopping any or all processes during a running condition (not shown).

Without using such a polling technique, due to the constraint that both ContinueDebugEvent( ) and WaitForDebugEvent( ) must be executed on the thread which creates the processes, multiple related processes cannot be simultaneously debugged by one instance of a debugger.

Figure 2:
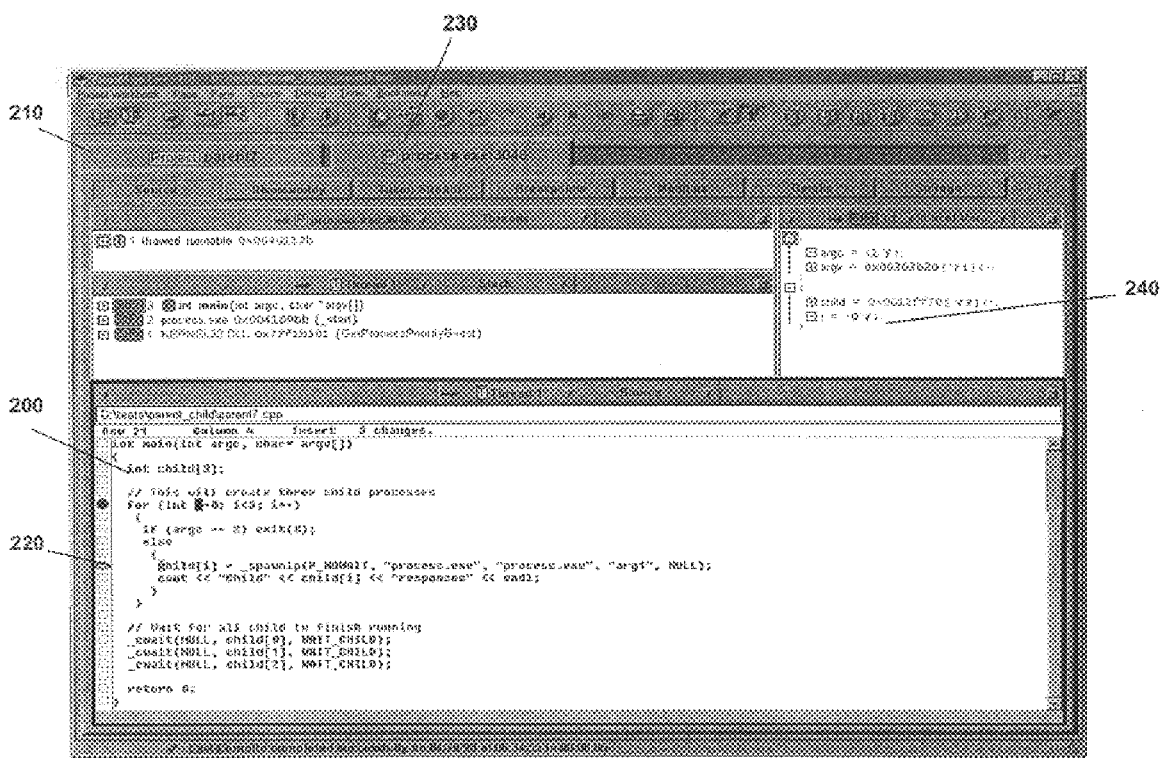
FIG. 2 illustrates the graphical user interface of an embodiment of the present invention showing information regarding a parent process.
Figure 3:
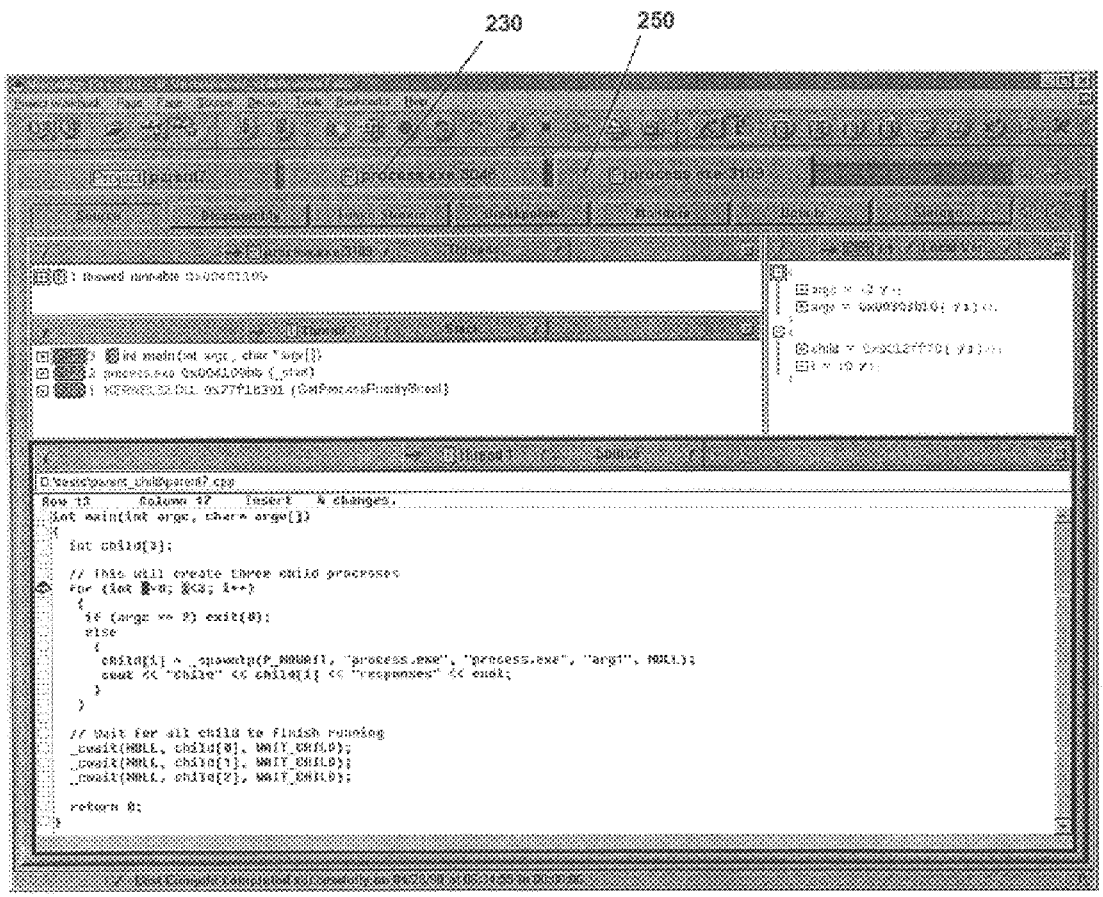
FIG. 3 illustrated the graphical user interface of an embodiment of the present invention showing information regarding a child process spawned from the parent process of FIG. 2.

Moreover, in a preferred embodiment of the debugger, the user will have the ability to control multiple related processes from within one instance of the debugger. Referring to FIG. 2, the graphical user interface (GUI) of an embodiment of the present invention in the IBM® Visual Age® C++ for Windows NT application development tool is shown. A simple program 200 that loops to spawn several related processes is shown. In this example, the program named "parent7" 210 has been started to create the parent process as shown on the GUI tab labelled "process.exe:3046" 230. To those skilled in the art, other non-graphical or graphical views to hold process information for viewing may be substituted for tabs such as folders and/or separate screens/pages.

Figure 4:
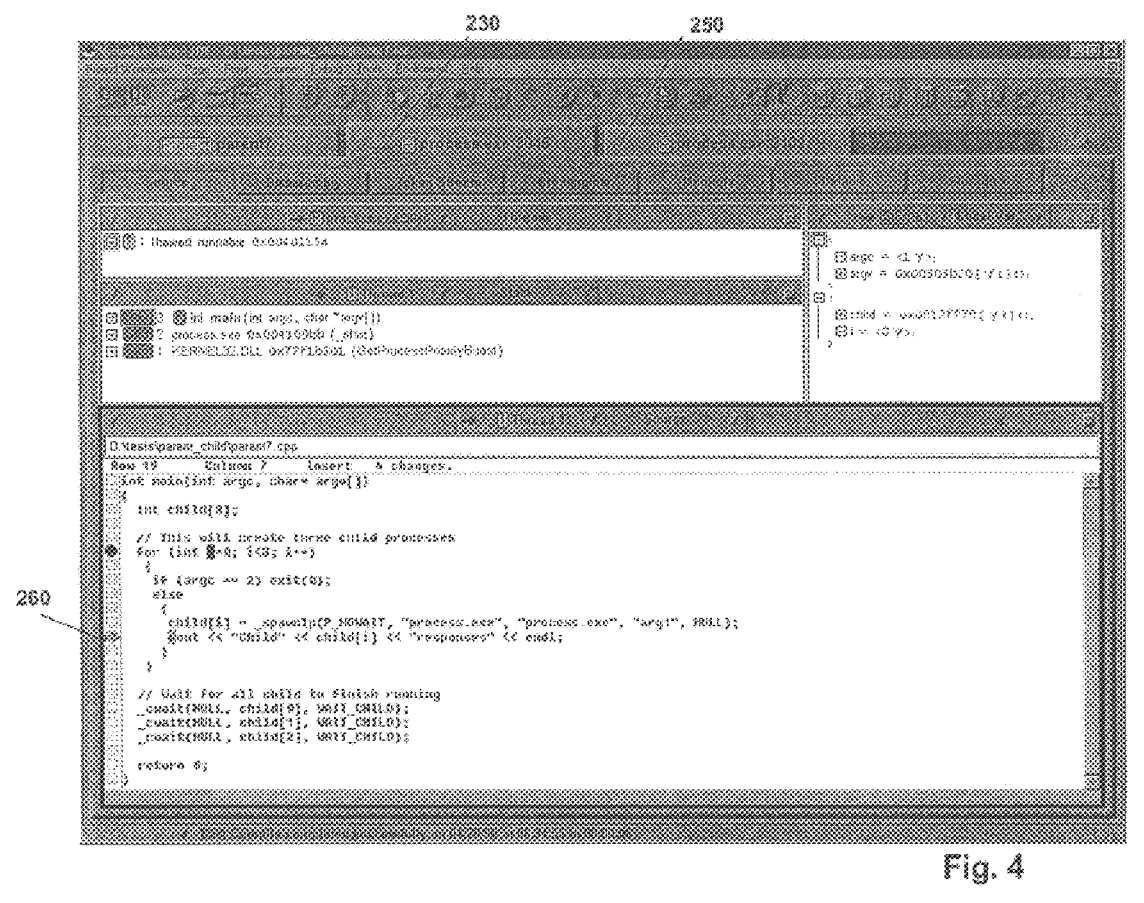
Figure 5:
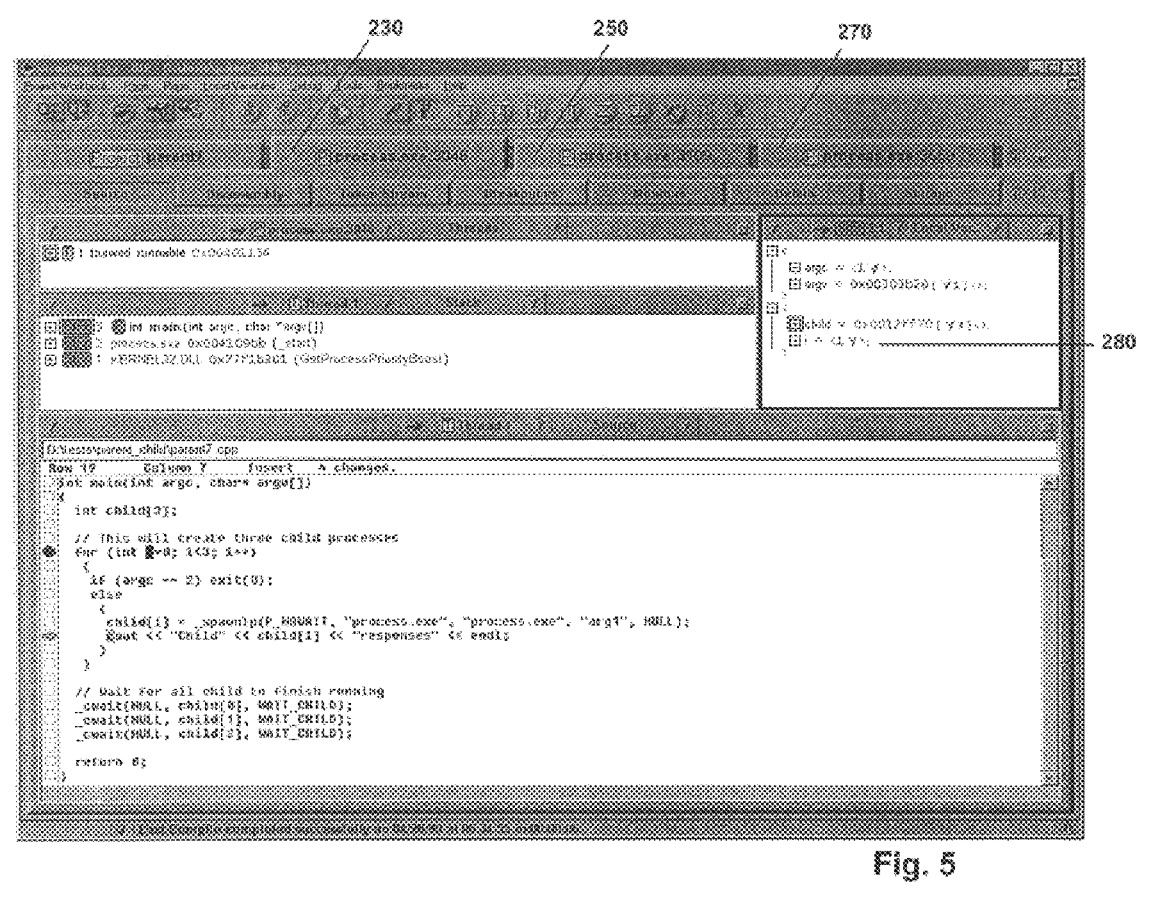

The program has been selected for debugging and a debug event is about to occur as shown at 220, namely the spawning of a child process. Importantly, the value of the variable i of the "for" loop in the program is 0 as shown at 240. This is the first iteration of this "for" loop and thus a first spawning of a child process. Continuing to FIG. 3, the spawning of a child process has been processed by establishing a new GUI tab 250 labelled "process.exe:3109" which shows details concerning this child process as well as the parent process. The processing of the parent process "process.exe:3046" 230 continues as shown in FIG. 4 at 260 where it can be seen that the program has stepped to the next line of code from that shown at 220 in FIG. 1. Preferably, information about the parent process may also be shown. Referring to FIG. 4, information regarding the parent process is still shown in the instance of the debugger at GUI tab 230 and a user may optionally select to view the parent or child process by choosing the appropriate tab in the debugger GUI. Turning to FIG. 5, it can be seen that the program has continued by iterating through the "for" loop as shown by the value 1 of the variable i at 280. The spawning of a second child process results in another debug event which is processed to create a GUI tab 270 labelled "process.exe:3558" which shows details concerning this child process as well as the parent process (not shown). As can be seen in FIG. 5, the parent process and its child processes may be debugged in a single instance of a debugger. Debug events in multiple related processes may be handled by creating new tabs in the user interface or updating existing tabs as the case may be and a user may select to view and manipulate these processes. Optionally, information which relates these multiple processes together may be viewed and linked together in the debugger's GUI.

While the preferred embodiment of this invention has been described in relation to the Windows 95/NT operating systems, this invention need not be solely implemented in this operating environment. Indeed, an operating system or computing environment that restricts a thread of execution to act on a certain process and all related processes may take advantage of the present invention. Further, any operating system or computing environment that provides for debugging of a process and all related processes but that blocks on the occurrence of a debug event within any of the process or its related processes may also take advantage of this invention.

Optionally, the invention may be implemented such that the handling of multiple related processes can be done selectively based on types of break events or selectively based on the processes. For example, certain or all processes may be stopped on the occurrence of any or a particular break event. Similarly, certain or all processes may be designated to restart upon the occurrence of any or a particular break event. Certain break events may be ignored. More particularly, using the preferred embodiment as an example, the step for processing a break event, which can include updating the state and views of the debugger, can be supplemented with functionality to process the handling of certain or all break events and the restart and stopping of all or certain processes. Finally, certain or all processes may be designated as stopped at the commencement of debugging to exclude certain processes from debugging.

The invention may be implemented as an article of manufacture comprising a computer usable medium having computer readable program code means therein for executing the method steps of the invention. Such an article of manufacture may include, but is not limited to, CD-ROMs, diskettes, tapes, hard drives, and computer RAM or ROM. Also, the invention may be implemented in a computer system. A computer system may comprise a computer that includes a processor and a storage device and optionally, a video display and an input device. Moreover, a computer system may comprise an interconnected network of computers.

While the invention has been particularly shown and described with respect to preferred embodiments thereof, it will be understood by those skilled in the art that the foregoing and other changes in form and details may be made therein without departing from the spirit and scope of the invention.

Having thus described our invention, what we claim as new, and desire to secure by Letters Patent is:

1. A method for debugging multiple related processes in one instance of a debugger comprising the steps of:

initiating debugging of a plurality of related processes in said debugger;

checking during a timeout period for a debug event that has occurred within said related processes;

if a debug event has occurred, processing said debug event; and after said steps of checking or processing, continuing debugging of all related processes.

2. The method of claim 1, wherein the step of processing said debug event comprises, if said debug event relates to spawning of a related process, creating a view in a graphical user interface of said debugger with respect to said spawned related process.

3. The method of claim 1, further comprising the step of selectively designating a process as stopped.

4. The method of claim 1, further comprising the step of:

determining if any of said related processes are stopped, waiting or running; and if there are no processes stopped, waiting or running, terminating the execution of the debugger.

5. The method of claim 1, wherein the step of processing said debug event comprises stopping a related process based upon a type of said debug event.

6. The method of claim 1, wherein the step of processing said debug event comprises, if said debug event relates to termination or completion of a related process, deleting a view in a graphical user interface of said debugger with respect to said terminated or completed related process.

7. The method of claim 1, performed in the Windows NT operating system.

8. The method of claim 7, wherein the step of checking comprises executing the WaitForDebugEvent( ) command for said timeout period and the steps of initiating and continuing comprise executing the ContinueDebugEvent( ) command for said related processes.

9. A method for debugging a program comprising the steps of:

designating a plurality of related processes of the program for debugging in a single instance of a debugger;

determining during a timeout period whether a debug event has occurred among said plurality of related processes;

if a debug event has occurred, processing said debug event; and performing said steps of designating, determining or processing repeatedly until all said related processes are terminated.

10. An article of manufacture comprising a computer usable medium having computer readable program code means therein for debugging multiple related processes in one instance of a debugger, the computer readable program code means in said computer program product comprising:

computer readable code means for initiating debugging of a plurality of related processes in said debugger;

computer readable code means for checking during a timeout period for a debug event that has occurred within said related processes;

computer readable code means for processing said debug event if said debug event has occurred; and computer readable code means for continuing debugging of all related processes after said checking or processing.

11. An article of manufacture of claim 10, wherein the computer readable code means of processing said debug event comprises computer readable code means for, if said debug event relates to spawning of a related process, creating a view in a graphical user interface of said debugger with respect to said spawned related process.

12. An article of manufacture of claim 10, further comprising computer readable code means for selectively designating a process as stopped.

13. An article of manufacture of claim 10, further comprising:

computer readable code means for determining if any of said related processes are stopped, waiting or running; and computer readable code means for, if there are no processes stopped, waiting or running, terminating the execution of the debugger.

14. An article of manufacture of claim 10, wherein said computer readable code means for processing said debug event comprises computer readable code means for stopping a related process based upon a type of said debug event.

15. An article of manufacture of claim 10, wherein the computer readable code means of processing said debug event comprises computer readable code means for, if said debug event relates to termination or completion of a related process, deleting a view in a graphical user interface of said debugger with respect to said terminated or completed related process.

16. An article of manufacture of claim 10, wherein said computer readable code means is capable of execution in the Windows NT operating system.

17. An article of manufacture of claim 16, wherein said computer readable code means for checking comprises computer readable code means for executing the WaitForDebugEvent( ) command for said timeout period and said computer readable code means for initiating and continuing comprise computer readable code means for executing the ContinueDebugEvent( ) command for said related processes.

18. An article of manufacture comprising a computer usable medium having computer readable program code means therein for debugging a program, the computer readable program code means in said computer program product comprising:

computer readable code means for designating a plurality of related processes of the program for debugging in a single instance of a debugger;

computer readable code means for determining during a timeout period whether a debug event has occurred among said plurality of related processes;

computer readable code means for, if a debug event has occurred, processing said debug event; and computer readable code means for performing said steps of designating, determining or processing repeatedly until all said related processes are terminated.

19. A computer system for debugging multiple related processes in one instance of a debugger comprising:

means for initiating debugging of a plurality of related processes in said debugger;

means for checking during a timeout period for a debug event that has occurred within said related processes;

means for processing said debug event if a debug event has occurred; and means for continuing debugging of all related processes after said checking or processing.

20. A computer system for debugging a program comprising:

means for designating a plurality of related processes of the program for debugging in a single instance of a debugger;

means for determining during a timeout period whether a debug event has occurred among said plurality of related processes;

means for, if a debug event has occurred, processing said debug event; and means for performing said steps of designating, determining or processing repeatedly until all said related processes are terminated.

* * * * *

UNITED STATES PATENT AND TRADEMARK OFFICE
CERTIFICATE OF CORRECTION

PATENT NO. : 6,516,460 B1
DATED : February 4, 2003
INVENTOR(S) : Eduardus A. Merks et al.

It is certified that error appears in the above-identified patent and that said Letters Patent is hereby corrected as shown below:

<u>Title page,</u>
Item [75], "North York" should read -- Ontario --

<u>Column 2,</u>
Lines 16-17, "CreateProcesso ( )" should read -- CreateProcess () --

<u>Column 4,</u>
Line 14, "beg-n" should read -- begin --

<u>Column 7,</u>
Line 2, "multiple.related" should read -- multiple related --

Signed and Sealed this

Thirteenth Day of May, 2003

JAMES E. ROGAN
*Director of the United States Patent and Trademark Office*